Aug. 16, 1960     I. D. KIZER     2,948,985
TRAP-TYPE FISH HOOK
Filed July 1, 1957
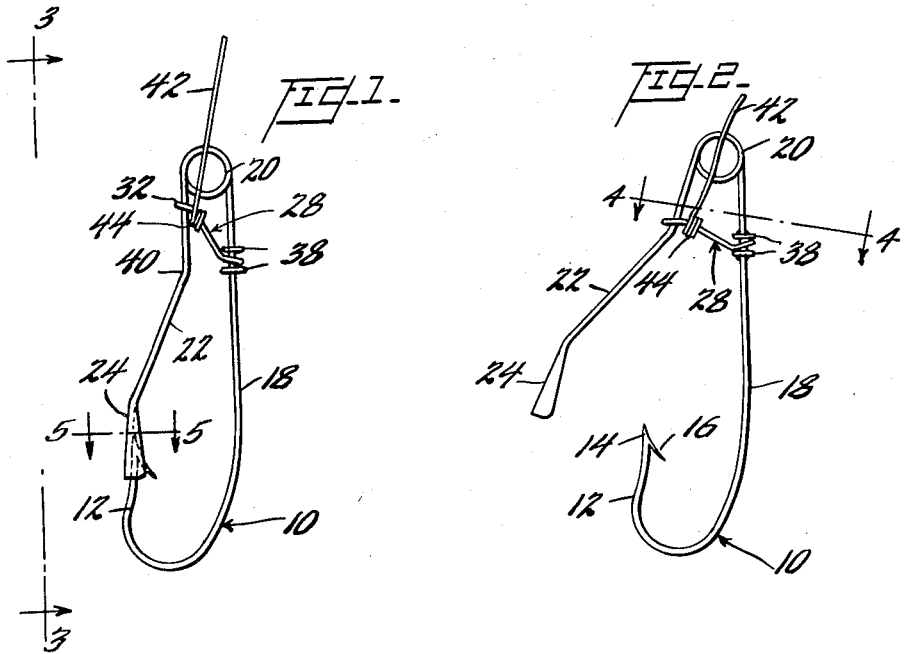
INVENTOR
*Ira D. Kizer;*
BY *Parker and Walsh.*
ATTORNEY

2,948,985
TRAP-TYPE FISH HOOK

Ira D. Kizer, Rte. 2, Prescott, Ark.

Filed July 1, 1957, Ser. No. 669,178

4 Claims. (Cl. 43—43.4)

This invention relates to a line-actuated trap-type fish hook.

The purpose of this invention is to provide an inexpensive, easily constructed, fish hook designed to prevent the escape of the fish after the hook has been struck.

An additional object of my invention is the provision of means for preventing the bill of the hook from becoming entangled in weeds or brush, after the hook has been struck.

Other objects and advantages of my invention will be apparent as the description proceeds.

For a fuller understanding of my invention, reference should be had to the accompanying drawing wherein:

Figure 1 is a side view of my invention showing the hook in closed, fish-engaging position;

Figure 2 is a similar view showing the invention in open position;

Figure 3 is an end view as seen along the lines 3—3 of Figure 1;

Figure 4 is a partial section along the 4—4 position of Figure 2;

Figure 5 is a partial section taken along the lines 5—5 of Figure 1; and

Figure 6 is a perspective view of the spreader member 28.

Referring now to the drawings, the numeral 10 designates a shank member of the hook. This shank is formed in the shape in which most conventional fish hooks are found. The U-shaped shank 10 has a shorter arm 12 at the end of which is the pointed bill 14. If desired, the bill may have a barb 16.

The opposite end of shank 10, designated 18 extends upwardly and may be continued to form coil spring 20 and extension 22, more or less parallel to the arm 18. Extension 22 terminates in a hood-like structure 24 with two side guards 26 forming a slot adapted to cover and guard the bill 14. As will be seen in Figure 1, the two arms 12 and 18 of shank 10, the coil spring 20 and the extension 22, when closed, form a loop bearing a resemblance to the household safety pin. Like the coil in such pins, coil 20 contains by preference, three half turns.

The loop is to be distinguished from such a safety pin in that the normal condition of the loop is in closed position, whereas the safety pin is in normally open position. The amount of force exerted by coil spring 20, tending to close the loop will necessarily vary with different size hooks and, somewhat upon anticipated fishing conditions. However, as a generalization only, it may be said that the strength of the spring will be roughly comparable to that in a safety pin of corresponding size.

To keep the extension 22 spread apart from the shank arm 18, a spreader member 28 is provided, fabricated of approximately the same gauge wire as the remainder of the hook. The member has a central shaft 30 provided with two eyes 32 and 34, one at each end, for loosely encircling the members 22 and 18 respectively. The shaft 30 may be slightly bent in opposite directions adjacent the eyes 32 and 34, at 36, as best shown in Figures 1, 2 and 6.

It is desirable to prevent the eye 34 from travelling extensively along arm 18 by means of a pair of tightly fitting rings 38 encircling arm 18. The eye 34 then has relatively limited three-dimensional hinged movement about that portion of arm 18 between the two rings 38.

The eye 32 has relatively greater lengthwise freedom of movement along extension 22. In order to provide a larger degree of clearance between hood 24 and bill 14, when the fish hook is open, it may be desirable to bend the extension 22 at 40.

Although the matter is not intensely critical, a proper balance of the relative dimensions of the parts, the finish polish of the parts and the bent position of shaft 30 at the points 36, are all arranged so that the spreader 28 will hold the extension 22 apart from the bill 14. However, it will be obvious that a line 42 passed through the loop of spring 20 and knotted at 44 on the spreader 28, will permit the loop to close when a sharp jerk, as by a fish striking, is applied to the rod end of the line.

The operation of the device will be obvious from inspection. The eye 32 is pressed downwardly along extension 22 while it is pulled outwardly, to prop the hook open whereupon the hook may be baited in whatever manner the fisherman considers appropriate. There will be sufficient friction in the vicinity of the two respective eyes to permit ordinary handling of the hook by casting or the like without serious likelihood of the loop closing. However, when a fish strikes and places a substantial amount of tension on the line 42, then the spreader will be pulled into the position shown in Figure 1 to effectively trap the fish.

An important feature of my invention is the hood guard 24 for the bill 14. Very frequently, when a fish has been caught with a conventional hook, the violent movement of the fish through the water after striking the hook, will cause the point of the bill to catch upon some underwater obstruction such as weeds or brush. This may result in loss of both hook and fish as well as the inhumane possibility of the hook being left in the mouth of the fish. My hook not only securely traps the fish; the hood 24 protects the protruding point of the bill from entanglement with underwater growth in the manner referred to. Also, even before a strike, the outwardly extending portion 22 tends to protect the bill.

When hooks made in accordance with my invention are to be kept in a tackle box, they may be stored in closed position at great advantage because there is no likelihood of entanglement.

The hook of this invention may be made without resort to materials or manufacturing processes outside those usually available and, because the product has the feel of and general resemblance to the usual hook, the fisherman is more content to use it than hooks made of unconventional material.

I claim:

1. A trap-type fish hook having parts forming a normally-closed elongated, wire loop including: a U-shaped shank having arms of unequal length, the longer arm forming a stem, a pointed bill and barb upon the shorter arm; a coil spring being integrally formed upon the outer portion of the longer stem arm; the wire of the coil being continued around as an integral extension generally parallel to the stem of the shank, the extension at the outer end thereof having an integrally formed hood portion adapted to overlie the bill from the outside of the loop to thereby close said loop, said spring serving to urge the hood against said bill; a spreader member, for the coil end of the loop, having a pair of eyes formed on the ends thereof for encircling the extension and the stem end of the shank respectively and slidable freely thereupon; a pair of rings set upon the stem of the shank on either side of the spreader eye for limiting the movement of the spreader along the stem; and means for securing a line to the spreader.

2. A trap-type fish hook having parts forming a normally-closed elongated, wire loop including: a U-shaped shank having a stem terminating in arms of unequal length, a pointed bill upon the shorter arm; a coil spring formed upon the outer portion of the longer arm; an extension generally parallel to the stem of the shank, the extension at the outer end thereof having a hood portion adapted to overlie the bill from the outside of the loop to thereby close said loop, said spring serving to urge the hood against said bill; a spreader member, for the coil end of the loop, having a pair of eyes formed on the ends thereof for encircling the extension and the stem end of the shank respectively and slidable freely thereupon, means for limiting the sliding movement of the spreader; and means for securing a line to the spreader.

3. A trap-type fish hook having parts forming a normally-closed elongated, wire loop including: a U-shaped shank having arms of unequal length, the longer arm forming a stem, a pointed bill upon the shorter arm; a coil spring formed upon the outer portion of the longer arm; an extension generally parallel to the stem of the shank, the extension at the outer end thereof having a hood portion adapted to overlie the bill from the outside of the loop to thereby close said loop, said spring serving to urge the hood against said bill; a spreader member, for the coil end of the loop, having a pair of eyes formed on the ends thereof for encircling the extension and the stem end of the shank respectively and slidable freely thereupon; a pair of rings set upon the stem of the shank on either side of the spreader eye for limiting the movement of the spreader along the stem and means for securing a line to the spreader.

4. A trap-type fish hook having parts forming an elongated normally-closed wire loop, said loop being of relatively greater width at the hook end than at the opposite end, including: a U-shaped shank having a stem terminating in arms of unequal length, a pointed bill upon the shorter arm, an integrally formed trilunulate coil spring upon the outer portion of the longer end of the shank; an integrally formed extension of the coil, the portion adjacent the coil being generally parallel to the stem of the shank, the outer portion of the extension being bent at an obtuse angle to close the loop, a U-shaped hood on the outer end of the extension, including a pair of flat sides to cover the bill, said spring serving to urge the extension inwardly of said loop and a spreader member having means on the ends thereof for encircling the upper, parallel arms of the loop and being freely slidable therealong, means for limiting the sliding movement of the spreader, said spreader being adapted to be connected to a fishing line.

References Cited in the file of this patent
UNITED STATES PATENTS

| | | |
|---|---|---|
| 549,814 | Nolan | Nov. 12, 1895 |
| 755,677 | Kraus | Mar. 29, 1904 |
| 825,639 | Curtis | July 10, 1906 |
| 2,149,062 | Maurer | Feb. 28, 1939 |
| 2,234,516 | Clark | Mar. 11, 1941 |
| 2,241,320 | Sarff | May 6, 1941 |
| 2,620,590 | Shaw | Dec. 9, 1952 |

FOREIGN PATENTS

| | | |
|---|---|---|
| 1,128,237 | France | Aug. 20, 1956 |